July 24, 1962   J. M. YOST ETAL   3,045,287
METHOD FOR MOLDING THIN SECTIONS OF TETRAFLUOROETHYLENE
Filed Feb. 23, 1960

INVENTORS.
James M. Yost
William E. Moritz
BY
Webb, Mackey & Burden
THEIR ATTORNEYS

United States Patent Office 3,045,287
Patented July 24, 1962

3,045,287
METHOD FOR MOLDING THIN SECTIONS OF TETRAFLUOROETHYLENE
James M. Yost, Sewickley, and William E. Moritz, Irwin, Pa., assignors to Allegheny Plastics, Inc., Coraopolis, Pa., a corporation of Pennsylvania
Filed Feb. 23, 1960, Ser. No. 10,450
6 Claims. (Cl. 18—55)

This application relates to a method for molding thin sections of tetrafluoroethylene.

Tetrafluoroethylene, more popularly referred to by the trademark "Teflon," is well known for its sealing and dielectric properties and its chemical inertness but it is equally well known for the difficulties which are incurred in its processing, forming and fabrication. In this connection, it is characteristically poorly adapted to modes of manufacturing involving strictly conventional use of conventional molding dies. More specifically, in the production of thin wall articles from tetrafluoroethylene in the forms of small sheets, disks, diaphragms, or like articles, it has been found that if molding pressure is applied directly to crystalline tetrafluoroethylene powder in the mold, so-called "low spots" or other irregularities result between the mold faces due to non-uniform powder distribution which produces weakened areas in the walls of the finished article. These low spots do not normally occur in the production of articles with sections greater than about 0.10" to about 0.15" in thickness as the minimum. While the products hereof are sometimes designed to run to this approximate thickness and higher, the thicknesses herein particularly contemplated range from about 0.01" to 0.06" thick; and in the present specification, the term "thin section" refers to the wall of an article, the thickness of which renders it liable to the formation of low spots in manufacture.

A further drawback is that tetrafluoroethylene, though belonging to the heat-plastic group of resinous materials known as thermoplastics, does not melt and flow as do conventional thermoplastics. When heated above 620° F., the gel temperature, tetrafluoroethylene undergoes a transition from a normal crystalline state to an amorphous gel, wherein particles of the resin fuse and exhibit a degree of strength and other mechanical properties whereafter only a limited amount of flow can be obtained even though the gel stays hot. Resistance of the gel to flow is even more pronounced if then cooled despite the fact that tetrafluoroethylene enjoys some reputation for cold flow characteristics when left under considerable pressure over a sustained period of weeks or months. Moreover, heating and cooling the dies according to a hot molding cycle for making each piece is time-consuming and results in a low production rate per set of dies.

We have discovered a way of employing essentially conventional dies to mold thin section tetrafluoroethylene. We have also discovered a type of suitably produced blanks therefor whereby the foregoing difficulties, particularly time consumption and weak spots in the walls, are materially reduced or substantially eliminated. In the practice of this invention, the blanks are preferably—although not necessarily in all cases—formed by cutting flat washers of tetrafluoroethylene resin from a stock tube of extruded or molded thick wall construction of that same resinous material. The blanks are then individually introduced between a coaxial pair of male and female dies adapted to be moved axially together in the usual fashion but being specifically adapted to be relatively rotated about that axis.

The heat of friction coupled with the clamping pressure exerted by the mold faces of the rotating dies causes the material to dish and to work rapidly into conformity with the die cavity with no resort to a hot molding cycle. While molding dies are used in the present process, it is essentially a drawing operation in that preformed blanks are required and the material requires physical work because of its resistance to hot flow as well as to cold flow.

After drawing is completed, the pressure exerted on the dies is released; and while the dished or drawn portion of the article is cooling in the dies, they are opened cold the article is removed from the open dies. Thereafter, the article is subjected to a separate trimming operation if necessary.

Although the invention is hereinafter described as employing a rotating female die, either die may be rotated or, if desired, both may be rotated, preferably in opposite directions. Their exact shape, contour, and finish will, of course, vary in accordance with the cross section to be made. A chrome-plated surface or an equivalent polished surface is desirable on one or both of the working faces of the dies to reduce wear and prevent corrosion.

In the accompanying drawings which illustrate a preferred embodiment of the invention:

Figure 1:
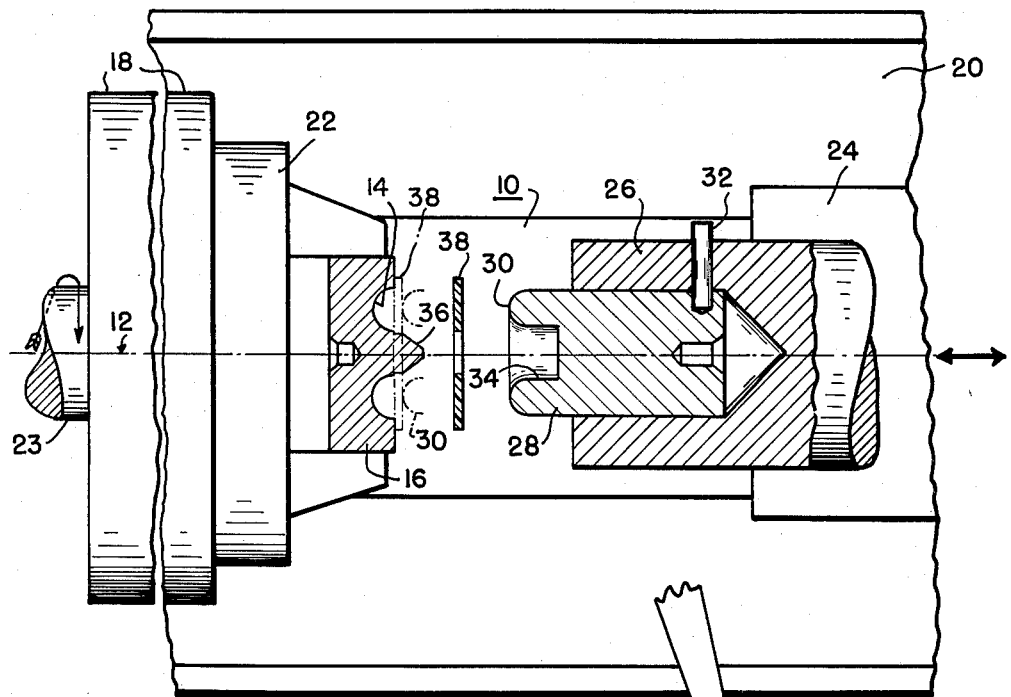
FIGURE 1 is a plan view of a portion of a lathe and associated parts for operating a set of molding dies in the practice of the present invention.

In the drawing, a set 10 of conventional molding dies of steel is shown having a common axis 12; one of the dies presents a concave surface 14 of revolution to form the desired cavity and constitutes a female die 16. The female die 16 is carried in the headstock 18 of a lathe 20 by means of a 3-jaw or a 4-jaw chuck 22. A power shaft 23 affixed to the headstock connects it to a drive motor (not shown) through a conventional set of adjustable ratio, lathe drive gears (not shown).

A tailstock 24 slidably mounted on the lathe 20 has a connection (not shown) to a die holder 26 by means of which it non-rotatably supports another die constituting a male die 28. The male die presents a convex surface of revolution 30 complementary to the semi-circular section of the cavity surface 14 in the female die and is locked against rotation by means of a pin 32 fixed in common to the holder 26 and to the male die 28. The male die 28 is relieved at the center to define a cavity 34 for receiving a pilot stud 36 which is shouldered if desired and which in any case holds a tetrafluoroethylene work blank 38 centered on the female die 16.

In operation of the lathe 20, the blank 38 is an open-centered washer introduced by hand and retained on the pilot stud of the female die 16 which undergoes constant rotation with the headstock 18. The tailstock 24 consists of a carriage controlled by a tailstock handle 40 which is conventional in lathes of this character and which can be oscillated either way in a horizontal plane to exert leverage and move the tailstock axially in the direction of the double-headed arrow in FIGURE 1. By means of this handle, the convex surface of the male die 28 is brought into the confronting dotted line position 30 so as to press against the centered blank 38 in a localized area. The existing speed of relative rotation between the confronting mold surfaces causes the intervening blank to slip along its interfaces of contact with one or both of these surfaces.

Axial pressure is manually maintained on the handle 40 so that the localized heat of friction developed and exerted against the blank 38 rapidly heats the portion contacted whence it will begin to yield and dish into complete conformity inside the cavity in the female die 16. As soon as the relatively rotating male and female dies 28 and 16 reach their final closed position of FIGURE 2, pressure is released and the dies are separated. Thereafter, the article is stripped off of the pilot stud 36 from the die cavity by hand or by appropriate ejectment machinery.

It is not essential that the rotation be continual in respect to the die which is rotated. A preferred variation in that connection is to rotate the die for a period under pressure and then interrupt the rotation while maintaining said pressure for a period immediately following. These periods are determined by experience depending upon the wall thickness of the article being worked, the die speed, etc. The relative rotation period may, for instance, be for 10 seconds; it may be interrupted for 5 seconds, whilst the pressure is maintained to let the article freeze or stabilize in its confined position, and then the dies are opened and the de-pressurized article is removed therefrom in the usual way.

Despite its normally low kinetic coefficient of friction, namely, 0.04 with polished steel, the tetrafluoroethylene rapidly reaches an appropriate temperature so as to exhibit better than cold flow characteristics and the resulting drawing operation not only makes the blank rapidly and accurately conform to the mold die surfaces, but it also imparts thereto a much smoother finish than heretofore obtained. These blanks, or preforms as they are called, are simply cold slugs of the material as they are introduced between the dies. After molding, cooling of the drawn article proceeds rapidly when pressure is removed and the dies separated and a separate cooling period is neither necessary nor desirable. However, in the case of continued high speed operation, it may be necessary to provide a coolant system to cool the dies.

Figure 5:
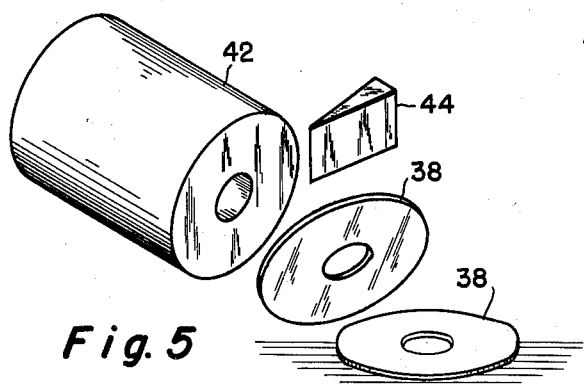
FIGURE 5 is a diagrammatic view showing how blanks for the article are formed.

Preform blanks are used as indicated and FIGURE 5 shows one way the blanks are produced from tetrafluoroethylene extruded tube stock 42 which is simply severed or sliced into washer disks 38 of predetermined thickness with a skiving knife 44. The stock 42 is thick-walled and may be rotated if desired while being severed or if the knife 44 is a circular cutting blade, the blade itself can be rapidly rotated as it is applied to facilitate cutting through the tube. In one physically constructed embodiment of the invention, the diametrical dimensions of the tube stock, which were identical for the blanks 38 as well, were 1 3/16" O.D. and 11/32" I.D. respectively.

Figure 2:
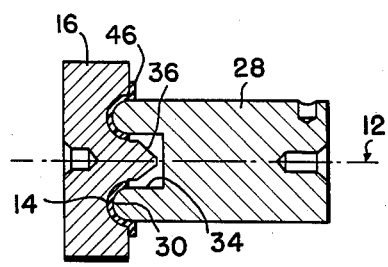
FIGURE 2 is the same as FIGURE 1, but with most of that showing removed and the dies advanced to closed position.

The article in FIGURE 2 will be noted to have a flat peripheral flange 46 which during the molding process maintains its status quo and is backed up by the flat face of the female die 16 but which can be omitted if smaller diameter blanks are used. It is not too significant because in either case a very substantial portion of the total material is actively drawn into the die cavity anyway.

Figure 3:
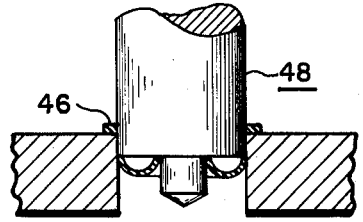
FIGURE 3 shows a trimming operation performed on the article.

FIGURE 3 shows one way of removal of this excess flange material 46 by a conventional trimming operation with appropriate trimming dies 48.

Figure 4:
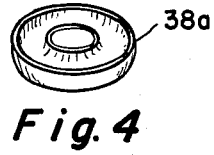
FIGURE 4 shows the finished article in perspective.

The completed dished washer forming the finished article is shown at 38a in FIGURE 4 and the thin wall, drawn section is found to be consistently uniform in thicknesses in instances such as illustrated where no taper is employed. The same principle applies, however, to tapered thin wall sections and rigid conformity to each engineering design drawing can be adhered to where properly designed mold faces are employed. Shrinkage and irregularities as between successive articles have been found to be drastically limited if manifest at all subsequent to the drawing operation of the product, when performed in accordance with the present invention. These articles have been found to be superior in dimensional stability when heated as compared to articles made by conventional processes.

It is not essential that both dies present a surface of revolution at their working face. Thus, if the user provides one or more radial slots relieving the face of either die, he can maintain slightly lower drawing temperatures and better heat control owing to the fact that one or several spaced apart lands are involved rather than a continuous interface of rubbing contact. It is essential, however, that the dies be rotated relative to each other. In practice, it has been found that the placing of the blank at the beginning of the drawing operation is somewhat more difficult using the modification just suggested.

It will be apparent from the foregoing that there is no appreciable time lag in heating the tetrafluoroethylene or wasted time for cooling. Moreover, smooth surfaces result and without the necessity for these thin sections to be heat treated in order to relieve the unannealed residual stresses therein. As stated, the foregoing process is perhaps more nearly analogous to a metal drawing operation than any other and the localization of pressure on the complete blank has a marked effect in working this non-metallic material rapidly into the specific shape desired. The specific article 38a with its circularly dished, semi-toroidal shape is an apertured transmission seal in the illustrated example of FIGURE 4 but various dished constructions and shapes are feasible both for sealing and for the many other purposes for tetrafluoroethylene above enumerated.

While we have shown a preferred embodiment of the present invention, it is, for the reason just indicated, to be understood that the principles thereof may be otherwise embodied without departing from the spirit of the invention or the scope of the following claims.

We claim:

1. Method for the production of thin articles from cold tetrafluoroethylene by a remolding operation between a coaxial pair of relatively cold male and female dies presenting complementary surfaces to one another, said method comprising centering a cold blank of the tetrafluoroethylene, forcibly bringing the dies together thus clamping a portion of the blank therebetween under axial pressure, simultaneously therewith while relatively rotating said dies developing heat of friction in said blank incidental to subjecting said portion thereof to a remolding pressure by means of said axial force on the dies, maintaining said pressure and rotation until a manifest yielding point of said blank portion is reached and the molding pressure dishes the article into complete conformity inside the cavity in said female die and then removing said pressure, and thereafter while the dished portion is cooling, removing the article from said dies.

2. Method for the production of thin articles from cold tetrafluoroethylene by a remolding operation between a coaxial pair of male and female dies presenting complementary surfaces to one another, said method comprising centering a blank of tetrafluoroethylene, forcibly bringing the dies together thus clamping a portion of the blank therebetween under axial pressure, simultaneously therewith while relatively rotating said dies developing heat of friction in said blank incidental to subjecting said portion thereof to a remolding pressure by means of said axial force on the dies, maintaining said pressure and rotation to raise said blank to a temperature whereby the molding pressure forces it into complete conformity inside the cavity in said female die and then removing said pressure, thereafter while the dished portion of the blank is cooling, removing the blank from said dies.

3. Method for the production of thin articles of tetrafluoroethylene by a remolding operation between a coaxial pair of male and female dies presenting complementary surfaces to one another, said method comprising centering a blank of tetrafluoroethylene, forcibly bringing the dies together thus clamping a portion of the blank therebetween under axial pressure, simultaneously therewith while relatively rotating said dies developing heat of friction in said blank incidental to subjecting said portion thereof to a remolding pressure by means of said axial force on the dies, maintaining said pressure and rotation to raise said blank to a temperature whereby the molding pressure forces it into complete conformity inside the cavity in said female die, interrupting said relative rotation while nevertheless maintaining said pressure for a period and then removing said pressure, thereafter while the dished portion of the blank is cooling, removing the blank from said dies.

4. Method for the production of thin section articles of tetrafluoroethylene by a remolding operation between a coaxial pair of male and female dies presenting complementary surfaces to one another, said method comprising centering a blank of the tetrafluoroethylene, forcibly bringing the dies together thus clamping a portion of the blank therebetween under axial pressure, simultaneously therewith while relatively rotating said dies developing heat of friction in said blank incident to subjectng said portion thereof to a remolding pressure by means of said axial force on the dies, maintaining said pressure and rotation until a manifest yielding point of said blank portion is reached and the molding pressure dishes it into complete conformity inside the cavity in said female die and then removing said pressure, thereafter while the dished portion of the blank is cooling, removing the blank from said dies, and subjecting the blank to a trimming operation when cooled.

5. Method of dishing thin section flat washers of tetrafluoroethylene by a drawing operation between a coaxial prising centering each washer on a pilot stud concentrically pair of male and female dies each defining a surface of revolution complementary to the other, said method comcarried by one of the dies, forcibly bringing the dies together thus clamping a substantial portion of the washer therebetween under axial pressure, simultaneously therewith while relatively rotating said dies developing heat of friction in said washer incidental to subjecting said portion thereof to a steady drawing pressure by means of said axial force on the dies, maintaining said pressure and rotation until a manifest yielding point of said washer portion is reached so as to enable the drawing pressure to dish it into complete conformity inside the cavity in said female die and then removing said pressure, and thereafter while the dished portion of the washer is cooling removing it from the dies.

6. A manufacturing operation comprising the steps of severing a series of thin individual preform articles of tetrafluoroethylene material from thick wall tube stock made of that material, centering each preform article of the series individually at a point between a pair of drawing dies which are at a temperature substantially below the gel temperature of tetrafluoroethylene, one of said dies having a cavity, forcibly bringing the dies together thus clamping a substantial portion of the article therebetween under axial pressure, simultaneously therewith while relatively rotating said dies developing heat of friction in said article incident to subjecting said portion thereof to a steady drawing pressure by means of said axial force on the dies, maintaining said pressure and rotation until a manifest yielding point of said article portion is reached and the drawing pressure dishes it into complete conformity inside the cavity of one of said dies, and then removing said pressure; and thereafter while the dished portion of the article is cooling in the dies, opening the latter and removing the article from the dies.

References Cited in the file of this patent

UNITED STATES PATENTS

| | | |
|---|---|---|
| 2,169,315 | Yngve | Aug. 15, 1939 |
| 2,399,592 | Bradshaw | Apr. 30, 1946 |
| 2,781,552 | Gray | Feb. 19, 1957 |

OTHER REFERENCES

"Fabrication With Frictional Heat," Robert N. Freres, Modern Plastics, November 1945, pp. 142–145.

UNITED STATES PATENT OFFICE

CERTIFICATE OF CORRECTION

Patent No. 3,045,287                                        July 24, 1962

James M. Yost et al.

It is hereby certified that error appears in the above numbered patent requiring correction and that the said Letters Patent should read as corrected below.

Column 2, line 10, for "cold" read -- and --; column 5, line 34, strike out "prising centering each washer on a pilot stud concentrically" and insert same after "com-" in line 36, same column 5.

Signed and sealed this 13th day of November 1962.

(SEAL)
Attest:

ERNEST W. SWIDER
Attesting Officer

DAVID L. LADD
Commissioner of Patents